United States Patent [19]
Luna

[11] Patent Number: 5,275,794
[45] Date of Patent: Jan. 4, 1994

[54] PROCESS FOR PRODUCING SODIUM BICARBONATE FROM NATURAL SODA SALTS

[76] Inventor: Raymundo R. Luna, Sierra Vista-Residencia 350, Colonia Linda Vista, Mexico 14, D.F., Mexico

[21] Appl. No.: 796,263

[22] Filed: Nov. 20, 1991

[51] Int. Cl.$^5$ .......................... C01D 7/02; C01D 7/18
[52] U.S. Cl. .................................... 423/190; 423/189; 423/194; 423/206.2; 423/420; 423/422; 423/423; 423/424
[58] Field of Search .................. 423/206, 18, 422, 423, 424, 189, 196, 419, 420, 194

[56] References Cited

U.S. PATENT DOCUMENTS

| | | |
|---|---|---|
| 2,005,868 | 1/1935 | MacMullin .......................... 423/427 |
| 2,671,713 | 3/1954 | Miller et al. ........................ 23/65 |
| 3,449,067 | 6/1969 | Schmitt et al. ..................... 23/65 |
| 3,868,444 | 2/1975 | Frevel et al. ....................... 423/422 |
| 4,283,372 | 8/1981 | Frint et al. ......................... 423/206 T |
| 4,320,106 | 3/1982 | Hentschel et al. ................. 423/424 |
| 4,337,234 | 6/1982 | Hentschel et al. ................. 423/424 |
| 4,654,204 | 3/1987 | Copenhafer et al. .............. 423/422 |

FOREIGN PATENT DOCUMENTS

| | | | |
|---|---|---|---|
| 521758 | 2/1956 | Canada . | |
| 688540 | 6/1964 | Canada | 423/424 |
| 462132 | 8/1936 | United Kingdom | 423/424 |

Primary Examiner—Gregory A. Heller
Assistant Examiner—Stephen G. Kalinchak
Attorney, Agent, or Firm—Knobbe, Martens, Olson & Bear

[57] ABSTRACT

Production of sodium bicarbonate from natural soda deposits that may occur as natural brines or solid soda salts is disclosed. The alkalinity in these natural soda deposits consists of carbonates and bicarbonates. The carbonates are converted to bicarbonates by reacting sodium carbonate with ammonium bicarbonate which acts as a carbon dioxide carrier until all the sodium carbonate is exhausted. The solubility of the sodium bicarbonate is lowered by the presence of non-alkaline sodium salts, e.g., sodium chloride. The regeneration of the cyclic reagent ($NH_3$) is done using the sodium bicarbonate formed by the double decomposition of sodium chloride and ammonium bicarbonate giving a final soda free brine exempt of contaminants foreign to its original components.

34 Claims, 4 Drawing Sheets

PROCESS FOR PRODUCING SODIUM BICARBONATE FROM NATURAL SODA SALTS

BACKGROUND OF THE INVENTION

The present invention relates generally to the field of carbonation processes; more specifically, the present invention relates to the use of ammonia in a carbonation process to obtain sodium bicarbonate ($NaHCO_3$) and/or sodium carbonate ($Na_2CO_3$) from natural soda deposits.

The Solvay process is a well-known and efficient process for the production of sodium bicarbonate from sodium chloride (NaCl). However, economical operation of this process requires recycling of ammonia gas ($NH_3$). This recycling is accomplished through the addition of calcium hydroxide $Ca(OH)_2$, resulting in the formation of calcium chloride ($CaCl_2$). There are no known cost-effective methods for the environmentally safe disposal of this calcium chloride. Thus, in most parts of the world, including the United States, the storage and disposal of calcium chloride is regulated, thereby curtailing the use of the Solvay process in countries having natural soda deposits.

Accordingly, in the United States and other countries that have soda deposits, sodium bicarbonate is produced from natural soda deposits. These deposits are widespread throughout the southwestern United States, in Mexico and in other parts of the world and consist of a mixture of sodium chloride, sodium carbonate, sodium bicarbonate, sodium sulfate, along with other soluble salts. However, in some parts of the world, including the United States, deposits containing solid trona are found. Trona is sodium sesquicarbonate ($Na_2CO_3 \cdot NaHCO_3 \cdot 2H_2O$). Trona deposits are often found substantially free of other soluble salts.

The technique generally used for the production of sodium bicarbonate from natural soda deposits is to bubble carbon dioxide gas through the soda brine solution. The introduction of carbon dioxide gas to a solution is known as carbonation.

REACTIONS OF PRIOR ART CARBONATION

In prior art carbonation, sodium carbonate hydrolyzes to sodium bicarbonate and sodium hydroxide upon dissolution in water, as follows:

$$Na_2CO_3 + H_2O \rightarrow NaHCO_3 + NaOH \quad \text{A.}$$

The carbon dioxide gas introduced into the brine forms carbonic acid which reacts with NaOH to form sodium bicarbonate, as follows:

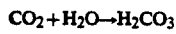

$$CO_2 + H_2O \rightarrow H_2CO_3 \quad \text{B.}$$

$$H_2CO_3 + NaOH \rightarrow NaHCO_3 + H_2O \quad \text{C.}$$

The amount of sodium bicarbonate present in the soda brine after carbonation will depend on the common ion effect of sodium and bicarbonate ions present in the brine, i.e., the presence of other sodium salts lowers the solubility concentration of sodium bicarbonate. The amount of sodium bicarbonate retained in the brine in solution (called the "mother liquor") will depend on the concentration of sodium and bicarbonate ions present in the mother liquor.

Table I shows the concentration of sodium bicarbonate in a sodium chloride solution saturated with carbon dioxide. A common industry practice is to obtain an indirect indication of the salt concentration of solutions by measuring their specific gravity. Accordingly, specific gravity figures are provided for each of the salt concentrations shown in Table I.

TABLE I

| Solubility of $NaHCO_3$ in a NaCl Solution Saturated with $CO_2$ at 30° C. | | |
|---|---|---|
| Specific Gravity | (NaCl) (g/100 ml) | ($NaHCO_3$) (g/100 ml) |
| 1.066 | 0.00 | 11.02 |
| 1.079 | 5.99 | 7.28 |
| 1.100 | 12.19 | 4.73 |
| 1.127 | 18.63 | 3.20 |
| 1.156 | 25.60 | 2.23 |
| 1.199 | 35.81 | 1.39 |

Using the prior art carbonation process, the dissolved sodium bicarbonate cannot be recovered and will remain in the mother liquor. It can be seen from Table I that at very high concentrations of sodium chloride, a significant concentration of sodium bicarbonate will remain in the mother liquor. Concentration of the soda brine can increase the salt concentration; however, such concentration requires significant amounts of energy, reducing the economic practicability of the process. Thus, in practice, this prior art carbonation process generally leaves approximately 30-40% of the carbonate content of the soda brine in the mother liquor, i.e., the process is only 60-70% efficient.

The natural soda deposits are non-renewable resources; accordingly, there is a need for more efficient, yet economical, recovery of the carbonates and bicarbonates contained therein without the production of ecologically damaging by-products.

One improvement on the prior art carbonation process for the production of sodium bicarbonate from sodium chloride without the formation of contaminates is disclosed in U.S. Pat. Nos. 4,320,106 and 4,337,234 to Hentschel et al. This process requires the use of high temperatures and organic compounds. The use of these conditions considerably raises the cost of production, and the use of sophisticated metallurgy is required for the processing equipment used with this process.

BRIEF DESCRIPTION OF THE FIGURES

Like reference numerals in FIGS. II, III and IV refer to like elements. However, the reference numerals used in connection with FIG. 1 are unique to that figure.

SUMMARY OF THE INVENTION

Figure 1:
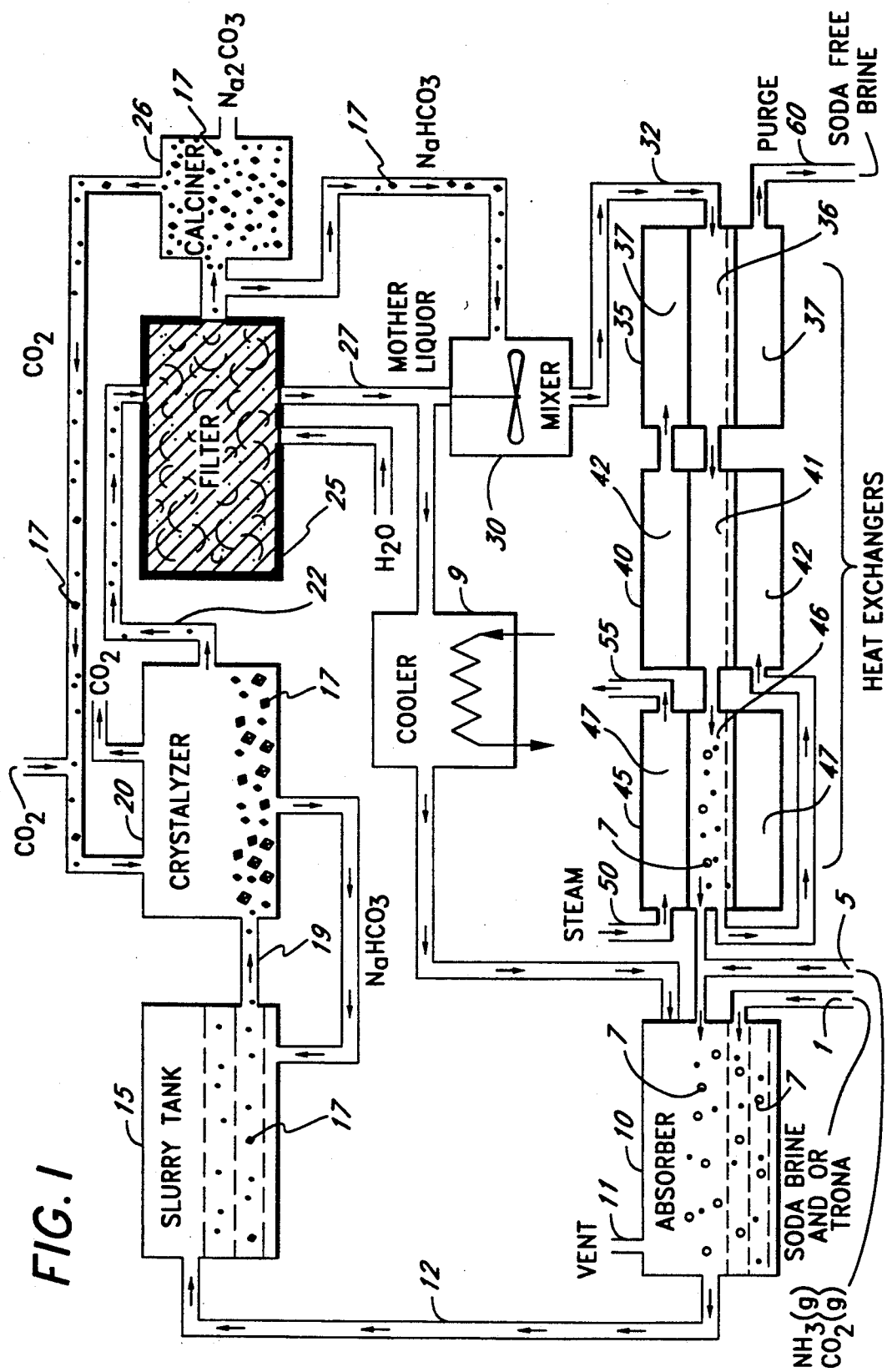
FIG. 1 is a schematic representation of a process for producing sodium bicarbonate in accordance with the present invention.

In accordance with one aspect of the present invention, there is provided a carbonation process for the production of solid sodium bicarbonate from natural soda deposits. This process comprises ammoniating the deposits to form ammonium hydroxide; carbonating the ammoniated deposits to form ammonium bicarbonate; reacting the ammonium bicarbonate with sodium carbonate to form sodium bicarbonate and ammonium hydroxide; and forming sodium bicarbonate and ammonium chloride from ammonium bicarbonate and sodium chloride. Preferably, the reacting step continues until all present sodium carbonate is depleted, the forming step continues until there is an excess of ammonium chloride over the amount of sodium bicarbonate, and the ammonium hydroxide acts as a carbon dioxide carrier until the sodium carbonate is depleted. In a preferred form of the process, the process additionally includes adding non-alkaline sodium salts to furnish sodium ions to decrease the solubility of sodium bicarbonate. The amount of ammonia required to add to the brine can be determined according to the amount of non-alkaline sodium salts in the brine, and this amount of ammonia can be determined in accordance with Table II. The process can also include separating solid sodium bicarbonate from solution after there is an excess of ammonium chloride over the amount of sodium bicarbonate. In one preferred form of the invention, the solid soda deposits are substantially free of non-soluble foreign material, the saturated mother liquor is formed as a result of the process, and the saturated mother liquor is used to introduce solid soda salts as feed to the process. In a preferred form of the process, saturated mother liquor is formed as a result of the process, and the process includes returning solid sodium bicarbonate to the saturated mother liquor in an amount equivalent to the difference between the equivalents of ammonium chloride in solution and the equivalents of sodium bicarbonate retained in solution. Preferably, this form includes heating the saturated mother liquor with the sodium bicarbonate in suspension to decompose the ammonium chloride in order to regenerate the ammonia as gas, and also includes recycling the regenerated ammonia into the process. The process preferably provides complete conversion of the sodium carbonate in the soda deposits to sodium bicarbonate, and the final solution after recovery of ammonia and carbon dioxide from the saturated mother liquor is a soda free brine to which no contaminants have been added. In another preferred form of this process, when the solid soda deposits include extraneous, insoluble solid material and this process additionally comprises dissolving the soda deposits in the soda free brine and filtering the resulting solution prior to entering the process. Preferably in this form of the invention, the volume of the solution in the system is maintained constant by purging excess volume, preferably after recovery of ammonia and carbon dioxide, and the soda free brine is further processed or sent to waste. This form of the invention can also include adding solid soda salts to the soda free brine; filtering the soda free brine; and recycling the filtered soda free brine to the process. This form can additionally include purging excess volume of fluid. In another preferred form of the invention the natural soda deposits comprise solid soda salts comprising at least one of the following: sodium carbonate ($Na_2CO_3$), sodium carbonate monohydrate ($Na_2CO_3 \cdot H_2O$), sodium carbonate heptahydrate ($Na_2CO_3 \cdot 7H_2O$), sodium carbonate decahydrate ($Na_2CO_3 \cdot 10H_2O$), sodium sesqui-carbonate ($Na_2CO_3 \cdot NaHCO_3 \cdot 2H_2O$), and Wegscheider salts ($Na_2CO_3 \cdot 3NaHCO_3$).

The present invention also provides a process for the substantially total recovery of the alkalinity from soda brine as crystallized sodium bicarbonate without the need for concentrating the soda brine, the soda brine comprising sodium carbonate, sodium bicarbonate and other soluble salts. This process comprises adding sodium chloride to the brine to bring the sodium chloride concentration of the brine to within the range 0.5 to 3.0 equivalents per liter; ammoniating the brine to form ammonium hydroxide by adding ammonia substantially in the amount in accordance with Table II; and carbonating the ammoniated brine to form ammonium bicarbonate by adding carbon dioxide in the amount of one mole of carbon dioxide per mole of ammonia added, plus one mole of carbon dioxide for each mole of sodium carbonate in the brine per liter. This method can also include supersaturating the carbonated brine with sodium bicarbonate and adding sodium bicarbonate seed crystals to relieve the supersaturation of the brine. The supersaturation preferably occurs from the sodium bicarbonate originally present in the brine, from sodium bicarbonate produced as a result of the ammoniating and carbonating reactions, and due to the lowered solubility of sodium bicarbonate resulting from non-alkaline sodium ions which were either present in the brine or added later. Preferably, the ammonium bicarbonate reacts with the sodium bicarbonate in the brine to form sodium bicarbonate and ammonium hydroxide until all of the sodium carbonate present is depleted and whereby the ammonium hydroxide acts as a carbon dioxide carrier. Still more preferably, when the sodium carbonate is exhausted and the supersaturation is relieved by crystallization, the sodium ions present in the brine react with the bicarbonate ions of the ammonium bicarbonate in a double decomposition to form ammonium chloride and sodium bicarbonate, and the solution of sodium bicarbonate suspension is analyzed for its ammonium chloride content and sodium bicarbonate content and the suspension is sent to the separator when the ammonium chloride concentration content exceeds the sodium bicarbonate in solution. Preferably, the reactions of the process occur in a crystallizer and generate a net heat gain, and the temperature of the crystallizer is kept below 40° C. by cooling the brine before processing or during the process, and the crystallized sodium bicarbonate is separated from the saturated mother liquor and portions of the solid bicarbonate are recycled to a slurry tank for use as the seed crystals. and preferably another portion of crystallized sodium bicarbonate is used to regenerate the ammonia from the saturated mother liquor; the rest of the sodium bicarbonate is calcined to form sodium carbonate (soda-ash) and carbon dioxide for the process. In a preferred form this process includes analyzing the separated, saturated mother liquor for its ammonium chloride and sodium bicarbonate content; determining the difference in the equivalent amount of ammonium chloride in solution from the equivalent amount of sodium bicarbonate in the solution; and adding an amount equivalent to the difference of crystallized sodium bicarbonate to the filtered saturated mother liquor. Preferably, the saturated mother liquor with the added sodium bicarbonate in suspension is heated to its boiling point to expedite the liberation of ammonia gas and carbon dioxide using steam, and the method includes heating and cooling the mother liquor using a heat exchanger in a counter current fashion. In a preferred form, there is a total recovery of the ammonia that is recycled, without having to use any of the sodium bicarbonate from the original alkalinity of the brine, there is substantially total recovery of the carbonates and bicarbonates dissolved in the original brine, as sodium bicarbonate crystals, and the final soda free brine is free of contaminants foreign to its original components, additionally comprising further processing the final soda free brine or sending the final soda free brine to waste.

Still another aspect of the present invention provides a process for the production of sodium bicarbonate from soda brine solution comprised of sodium carbonate in water. This process comprises adding the soda brine to an absorber tank; adding carbon dioxide and ammonia gases to the absorber, thereby forming a supersaturated solution of sodium bicarbonate; precipitating at least some of the sodium bicarbonate, thereby forming a suspension of solid sodium bicarbonate in mother liquor; and separating the solid sodium bicarbonate from the mother liquor. The method can also include adding sodium chloride to the soda brine. In one preferred form of the process, the soda brine additionally comprises sodium chloride and sodium bicarbonate, and the process additionally includes heating the mother liquor to which sodium bicarbonate has been added in order to expedite the liberation of ammonia and carbon dioxide gases. In one preferred form of the invention, the process also includes adding solid sodium bicarbonate to the mother liquor in an amount sufficient to liberate ammonia and carbon dioxide gases; recovering the ammonia and carbon dioxide gases; and repeating the process using recovered gases. The steps can be repeated to provide constant flow. In a preferred form the process includes analyzing the mother liquor for ammonium chloride and sodium bicarbonate content and adding an amount of solid sodium bicarbonate equivalent to the difference between the analyzed amount of ammonium chloride and the analyzed amount of sodium bicarbonate.

More carbon dioxide than is recovered can be added, and the supersaturated solution can be transferred to a slurry tank where solid sodium bicarbonate forms. Preferably, solid sodium bicarbonate seed crystals are added to the supersaturated solution in the slurry tank in order to expedite the formation of solid sodium bicarbonate, and the retention time in the slurry tank is substantially zero. Preferably this process additionally comprises transferring the supersaturated solution to a crystallizer tank having a non-zero retention time where formation of solid sodium bicarbonate occurs. Still more preferably, the method includes heating the mother liquor to which sodium bicarbonate has been added thereby expediting the liberation of ammonia and carbon dioxide gases, and the heating step comprises passing the mother liquor through a heat exchanger in which steam is provided as a heat source. The method can also include passing the heated mother liquor to a second heat exchanger to exchange heat with incoming mother liquor in which Reactions VII through IX have not yet significantly occurred. In a preferred form of this process, the process includes recovering the heated mother liquor after liberation of ammonia and carbon dioxide gases and using the recovered mother liquor in a second heat exchanger in which the mother liquor to which sodium bicarbonate has been added passes, thereby heating the mother liquor to which sodium bicarbonate has been added and cooling the recovered mother liquor. The present invention also provides a process for the production of solid sodium carbonate, comprising producing sodium bicarbonate according to a process disclosed herein and heating the sodium bicarbonate to form sodium carbonate.

OVERVIEW OF THE INVENTION

Briefly, the present invention provides a carbonation process for the total extraction of the alkalinity as sodium bicarbonate from natural soda deposits by ammoniating the solution of these natural soda salts to form ammonium hydroxide; carbonating to form ammonium bicarbonate; and reacting the ammonium bicarbonate with the sodium carbonate and water present in the soda brine to form sodium bicarbonate and ammonium hydroxide. The ammonia hydroxide formed by this reaction preferably reacts with the carbonic acid in solution to again form ammonium bicarbonate which reacts with additional sodium carbonate until the sodium carbonate is depleted; in other words, the ammonium hydroxide preferably acts as a carbon dioxide carrier in this reaction.

In the preferred embodiment, sodium bicarbonate crystallizes from the super-saturated solution formed by non-alkaline sodium salts, i.e., sodium sulfate or sodium chloride, which furnish the sodium ions ($NA+$), and from the bicarbonate ions ($HCO_3-$) from the ammonium bicarbonate which are in sufficient quantities, as will be explained below, to saturate the brine with sodium ions ($Na^+$) and bicarbonate ions ($HCO_3_-$). The sodium bicarbonate in the natural soda salts and the sodium bicarbonate produced from the sodium carbonate, in the natural soda salts, on reacting with the ammonia bicarbonate super-saturates the brine which on crystallizing gives a saturated mother liquor with 0.1 equivalents or less in contact with sodium bicarbonate crystals in suspension.

In the preferred embodiment, there is required a minimum concentration of sodium ions ($Na^+$) from non-alkaline sodium salts, e.g., sodium chloride of 0.5 equivalents per/liter or more and an ammonia concentration in the range referred to in Table II (provided herein below). The required concentration of ammonia will depend on the concentration of the non-alkaline sodium salts, such as sodium chloride, in the brine solution.

The amount of carbon dioxide required in this preferred embodiment is the following:
  One (1) mole of carbon dioxide per mole of ammonia as referred to in Table II per liter; plus
  One (1) mole of carbon dioxide per mole of sodium carbonate dissolve in liter of the brine solution.

The ratio of non-alkaline sodium salts, i.e., sodium chloride to ammonia as referred to in Table II plus the carbon dioxide in equal molar amounts to the ammonia added to the solution will furnish the ions required to saturated the solution in relation to sodium bicarbonate. The sodium bicarbonate in the original natural soda salts plus the sodium bicarbonate formed by the addition of one (1) mole of carbon dioxide per mole of sodium carbonate will super-saturate the brine with sodium bicarbonate. There is a net heat gain in this process and the temperature is preferably kept below 40° C. by cooling the brine before processing or during the process.

The super-saturation is preferably relieved by the crystallization of the sodium bicarbonate. This can be helped by adding solid sodium bicarbonate as seed crystals. When the mother liquor loses its super-saturation the sodium chloride and the ammonium carbonate in the solution react in a double decomposition reaction to form sodium bicarbonate and ammonium chloride; this reaction can be allowed to proceed until there is an excess of ammonium chloride to sodium bicarbonate in solution. When the ammonium chloride in solution exceeds the sodium bicarbonate concentration the suspension can be separated. Solid sodium bicarbonate is then preferably returned to the saturated mother liquor in an amount equivalent to the difference between the ammonium chloride and sodium bicarbonate in solution.

The saturated mother liquor with the added solid sodium bicarbonate in suspension can be heated in counter current heat exchangers and brought to its boiling point with steam, to evolve ammonia and carbon dioxide gases which can be recycled to the process.

The solid sodium bicarbonate used to decompose the ammonium chloride to recover the ammonia is preferably formed by the double decomposition of the sodium chloride and ammonium bicarbonate. Thus, the carbonates and bicarbonates in the original natural soda deposits can theoretically be recovered quantitatively as sodium bicarbonate.

The soda brine can be naturally occurring or, in certain instances, can additionally require the addition of water to solid sodium carbonate trona or Wegscheiders salts before being introduced to the process.

The soda free brine, from which the ammonia and carbon dioxide have been recovered, can be used to introduce solid soda salts to the process without the addition of contaminants. This provides recovery of non-alkaline salts. Any excess can be sent to waste, depending on the composition of the soda free brine.

REACTIONS OF THIS INVENTION

The process includes an ammoniating step in which ammonia gas is added to the soda brine. The result is that ammonium hydroxide is produced from the water in the soda brine, as follows:

$$NH_3 + H_2O \rightarrow NH_4OH \qquad (I)$$

The process also includes a carbonation step in which ammonium bicarbonate is formed, as follows:

$$CO_2 + H_2O \rightarrow H_2CO_3 \qquad (II)$$

The ammonium hydroxide reacts with the carbonic acid:

$$NH_4OH + H_2CO_3 \rightarrow NH_4HCO_3 + H_2O \qquad (III)$$

Sodium carbonate present in the brine will hydrolyze into sodium bicarbonate and sodium hydroxide. The ammonium bicarbonate formed by reactions I, II and III will react with the sodium hydroxide to also form sodium bicarbonate. These reactions occur as follows:

$$Na_2CO_3 + H_2O \rightarrow NaHCO_3 + NaOH \qquad (IV)$$

$$NaOH + NH_4HCO_3 \rightarrow NaHCO_3 + NH_4OH \qquad (V)$$

Thus the reaction of the ammonia bicarbonate with the sodium carbonate and water present in the brine can be shown as the sum of reactions IV and V, as follows:

$$Na_2CO_3 + NH_4HCO_3 + H_2O \rightarrow 2NaHCO_3 + NH_4OH \qquad (IV+V)$$

The process produces a net heat gain, due to the exothermic reaction shown by reaction III. The same exothermic reaction occurs from the ammonium hydroxide produced by reaction V reacting with the carbonic acid ($H_2CO_3$) produced by reaction II. Preferably, the temperature is kept below 40° C. by cooling.

After all the sodium carbonate present in the soda brine has reacted to form sodium bicarbonate, there is a further formation of sodium bicarbonate due to the double decomposition of the sodium chloride and the ammonium bicarbonate produced from reaction III.

If an insufficient amount of sodium chloride or other source of non-alkaline sodium ion is present in the solution, it is generally necessary to add sodium chloride or another non-alkaline sodium salt to the brine in order to effect this reaction. Thus, the reaction of ammonium bicarbonate and sodium chloride proceeds as follows:

$$NH_4HCO_3 + NaCl \rightarrow NaHCO_3 + NH_4Cl \qquad (VI)$$

Accordingly, additional sodium bicarbonate will form through reaction VI. Thus, all bicarbonates present in the brine above the saturation concentration will crystallize from the solution, super-saturated with sodium bicarbonate ($NaHCO_3$). The bicarbonates are derived from three sources: (1) the bicarbonates originally present in the brine; (2) bicarbonates converted from carbonates present in the brine; and (3) bicarbonates derived from the double decomposition reaction. Accordingly, the process of the present invention provides for the complete conversion of all carbonates and bicarbonates present in the natural soda deposits to solid sodium bicarbonate and are recovered as a crystallized mass of sodium bicarbonate.

The sodium bicarbonate crystals can be separated using any method known to those of skill in the art, such as through filtering or centrifugation.

In order to totally recover ammonia and carbon dioxide gases from the mother liquor, solid sodium bicarbonate that crystallize in the double decomposition reaction can be added back to the saturated mother liquor and the solution heated, resulting in the following reactions:

$$H_2CO_3 + heat \rightarrow CO_2 + H_2O \qquad (VII)$$

$$NH_4HCO_3 + heat \rightarrow NH_3 + CO_2 + H_2O \qquad (VIII)$$

$$NaHCO_3 + NH_4Cl + heat \rightarrow NaCl + NH_3 + CO_2 + H_2O \qquad (IX)$$

The recovered ammonia and carbon dioxide gas ($CO_2$) can then be reused for reactions I and II of the process.

It can be seen from reaction IX than an equivalent amount of sodium bicarbonate and ammonium chloride is needed in order to fully recover ammonia gas from the mother liquor. This amount of sodium bicarbonate will be the sodium bicarbonate derived solely through the double decomposition reactions that form sodium bicarbonate ($NaHCO_3$) and ammonium chloride ($NAH_4Cl$). Thus, no carbonates or bicarbonates originally present in the brine need be used for regeneration of ammonia and carbon dioxide.

The sodium bicarbonate recovered by the process of the present invention can be converted to carbonate (soda-ash) by methods known to those of skill in the art, through calcining (heating) at 170°14 190° C.

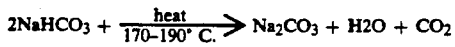

$$2NaHCO_3 + \xrightarrow[170-190°C.]{heat} Na_2CO_3 + H_2O + CO_2$$

Constant Flow Process

Referring now to FIGS. 1, 2, 3 and 4 in detail, there is shown a schematic representation of a constant flow process of the present invention. As will be apparent to those of skill in the art from the following description, the process can advantageously be implemented using simple equipment, with a minimal cost of labor, raw material and energy.

In FIG. 1, the process begins with soda brine and ammonia and carbon dioxide gases; the soda brine is added to an absorber A through soda brine input 1 and ammonia and carbon dioxide gases are added to the absorber through input 10.

The amount of ammonia required to recover all carbonates and bicarbonates in the brine as solid sodium bicarbonate is made possible by first analyzing the brine for its content of carbonates, bicarbonates and non-alkaline sodium salts, e.g., sodium sulfate or sodium chloride equivalents per liter.

With the equivalents of carbonates and bicarbonates content and total sodium per liter, the amount of non-alkaline sodium ions can be determined by subtracting the equivalent amounts of carbonates and bicarbonates from the total sodium equivalent content. These non-alkaline sodium ions are generally present as sodium chloride, but can also be present as sodium sulfates. If the soda brine lacks sufficient amounts of these sodium ions, then sodium chloride is added to the brine, as stated above, since the sodium ions are necessary for reaction VI to proceed.

The less non-alkaline sodium salts present, i.e., sodium chloride, the greater the amount of ammonia and carbon dioxide which will be required for the process.

Accordingly, the preferred amounts of ammonia gas required depend on the sodium chloride concentration of the brine, these determined values are shown in Table II.

TABLE II

| REQUIRED AMOUNTS OF AMMONIA | |
|---|---|
| Non-Alkaline Sodium Salts i.e. Sodium Chloride (Equiv.L) | Required Ammonia (Equiv./L) |
| 0.5 | 3.0–6.0 |
| 1.0 | 1.5–3.0 |
| 2.0 | .75–1.5 |
| 3.0 | .50–1.0 |
| 4.0–5.0 | .40–.80 |

As is apparent from the above Table II, the amount of ammonia added is inversely proportional to the amount of sodium chloride present in said solution, such that the amount of ammonia multiplied by the amount of sodium chloride is in the range of 1.5 to 3.0.

Thus, with knowledge of the relative costs of sodium chloride and ammonia, additional sodium chloride can be added to optimize the cost the of process.

The amount of carbon dioxide required is determined from both the ammonia content and the sodium carbonate content of the brine. Thus, the amount of carbon dioxide is preferably determined by adding one mole of carbon dioxide for each equivalent of ammonia and one mole of carbon dioxide for each mole of sodium carbonate per liter in the brine.

In one embodiment of the present invention, as shown in FIG. 1, the flow rate and size and shape of the absorber 10 are configured to provide a fifteen to forty-five minute retention time in the absorber 10. The absorption of the gases allows exothermic reactions I through IV to begin to occur, thus resulting in a temperature rise. However, if the input brine is at an elevated temperature, it is advantageous to cool it, e.g. in a cooling tower, before adding ammonia and carbon dioxide gases. This prevents the temperature of the brine from rising too high, i.e. above about 40° C., prior to recovery of bicarbonate crystals. In the preferred embodiment, in which solid trona is used, the mother liquor in which the trona is suspended is first cooled in cooler 9 before adding the trona, and thus, the temperature is prevented from rising above 40° C. prior to recovery of the bicarbonate crystals.

Preferably, the absorber 10 is agitated in order to facilitate absorption. It is not necessary for Reactions I through VI to proceed to completion within the absorber 10, so long as the gases are well absorbed. Thus, the absorber is preferably provided with a vent 11, which will allow excess gas to leave the system. The outflow of the absorber 10 is a supersaturated solution of sodium bicarbonate.

The outflow from the absorber proceeds in a constant flow through the absorber outflow 12 to a slurry tank 15 in which a slurry of sodium bicarbonate is introduced to act as seed crystals. Preferably, crystals 17 in an amount about 5-10% of the weight of soda brine is added as seed crystals to relieve the supersaturation. This slurry can be obtained from the sodium bicarbonate produced in a crystallizer 20 through the constant flow process, as will be described hereinbelow.

The slurry tank 15 is preferably designed to provide a retention time of near zero. Thus, the outflow from the slurry tank can proceed almost immediately into a slurry outflow 19 and into a crystallizer 20, where Reactions I through VI proceed to completion and sodium bicarbonate crystals are allowed to form. The crystallizer 20 is another closed, agitated tank. The constant flow system of the preferred embodiment is preferably designed to allow for a relatively long retention time of two to four hours in the crystallizer 20. The temperature within the crystallizer 20 is preferably kept below 40° C. by limiting the input temperature of the brine, as described above. Advantageously, complete crystallization occurs therein without any need for concentrating the brine. $CO_2$ is added to the crystallizer in order to complete the carbonation process. As will be described below, $CO_2$ evolved from a calciner 25 can partially fulfill this requirement for $CO_2$. The process theoretically generates more $CO_2$ than needed, thus any excess $CO_2$ is allowed to escape from the crystallizer 20. In a preferred embodiment of the present invention, a series of crystallizers is used to provide a retention time of two to four hours.

The outflow from the crystallizer 20, now consisting of sodium bicarbonate crystals 17 and mother liquor proceeds through the crystallizer outflow 22 and into a separator 25. In the preferred embodiment, the separator 25 is a filtration apparatus; however, separation can also be accomplished with other separation devices known to those of skill in the art, such as a centrifuge.

The separated sodium bicarbonate crystals 17 can then be removed from the mother liquor and washed with $H_2O$. The wash solution can be recovered and returned to the mother liquor. The crystals 17 are then ready for further processing or use. An example of such a further processing step is calcining the crystals 17 in calciner 26 at a temperature in the range 170°-190° C. in order to produce carbonates therefrom. In an alternative embodiment, a portion of the separated sodium bicarbonate crystals 17 can be removed for use as seed crystals in the slurry tank 15, as previously described. The calcining step produces $CO_2$ which can be returned to the crystallizer 20, as previously described.

The mother liquor now devoid of crystals 17 proceeds through the separator outflow 27 and into a mixer 30, where another portion of the separated sodium bicarbonate crystals is added in order to allow Reaction IX to proceed. The system requires a very short retention time in the mixer 30, solely in order to allow the sodium bicarbonate crystals 17 to be suspended in the mother liquor with the mixing action of the mixer.

In one embodiment of the process, in which solid salts are used, the filtered mother liquor is cooled in cooler 9 and then can be used to suspend additional trona or other carbonate containing material to create more soda brine for input into the system, through the absorber 10. Accordingly, use of this embodiment recovers only a fraction of the ammonia contained in the mother liquor in each cycle through the system.

In order not to use excess sodium bicarbonate in the regeneration process of Reaction IX, yet still fully recover ammonia gas, the ammonium chloride content of the mother liquor can be analyzed in a manner known to those of skill in the art prior to the addition of sodium bicarbonate. For example, the ammonium chloride content can be analyzed by any method known to those of skill in the art. After this analysis, an equivalent amount of sodium bicarbonate is added to the mother liquor prior to heating, for full recovery of ammonia gas without waste of sodium bicarbonate.

The mother liquor already is at an elevated temperature, generally about 40° C., due to the net exothermic nature of the reactions which have occurred, as previously described. However, in order to fully liberate ammonia gas and carbon dioxide, a further rise in temperature, to the boiling point, can be used. Thus, in order to heat the mother liquor efficiently, the mother liquor can be sent through a series of heat exchangers in a counter current fashion.

As shown in FIG. 1, three heat exchangers 35, 40, 45 are provided; however those of skill in the art will recognize that the number and size of the heat exchangers can be varied in order to optimize the amount of energy required to heat the mother liquor. In the schematic representations of the heat exchangers 35, 40, 45 of FIG. 1, the material to be heated is shown passing through the middle sections 36, 41, 46 of the exchangers, while the material to be cooled is shown in single outer sections 37, 42, 47 around each of the middle sections 36, 41, 46.

Thus, as shown, the mother liquor, containing the determined concentration of sodium bicarbonate, proceeds into the mixer outflow 32 from the mixer 30 and into the middle section 36 of the first heat exchanger 35. The temperature of the mother liquor is initially heated in the first heat exchanger by the ammonia and carbon dioxide depleted mother liquor flowing through the heat exchanger in a counter current fashion to be purged from the system.

The mother liquor then proceeds into the middle section 41 of the second heat exchanger 40, where the temperature is raised still further. The mother liquor then proceeds into the middle section 46 of the third heat exchanger where the temperature of the mother liquor is raised still further by steam passing from a steam input 50 into the outer section 47 of the third heat exchanger 45. The steam then leaves the heat exchanger through steam output 55. In the last heat exchanger 45, the steam heats the mother liquor to a temperature at which Reactions VII-IX readily occur, resulting in the complete evolution of ammonia and carbon dioxide gases contained in the mother liquor.

The evolved gases 7 are drawn off into the gas input line 5 for reapplication to the absorber 10. Once the system has been operating through at least one complete cycle, it is generally necessary to add a small amount of additional ammonia gas and/or carbon dioxide through gas inlet 5, in order to keep the concentration of ammonia to a levels in accordance with the values of Table II.

As discussed above, theoretically, the process will produce more carbon dioxide than is necessary. However, in practice, we have found that it is generally necessary to add an additional amount, above that amount of $CO_2$ to completely carbonate the brine during constant flow, in accordance with the method for determining the amount of carbon dioxide described above.

MATERIAL BALANCE

Example 1

Material Balance for Soda Brine Having 1.0 Mole of Sodium Chloride in Soda Brine Containing 1.0 Mole of Sodium Sesqui-Carbonate Per Liter

| A - AMMONIATION AND CARBONATION | | |
|---|---|---|
| Soda Brine Eq. | Moles | Super Sat'd Soln. Eq. |
| 2.0 NaHCO$_3$ | 2 NH$_3$ | 3.0 NaHCO$_3$ |
| 1.0 NaOH + | 3 CO$_2$ $\longrightarrow$ | 2.0 NH$_4$HCO$_3$ |
| 1.0 NaCl | 2 H$_2$O | 1.0 NaCl |

| B - CRYSTALLIZATION | | |
|---|---|---|
| Super Saturated Solution Eq. | Crystallization Eq. | Mother Liquor Eq. |
| 3.0 NaHCO$_3$ | | 1.8 NH$_4$HCO$_3$ |
| 2.0 NH$_4$HCO$_3$ $\xrightarrow{cryst.}$ | 3.1 NaHCO$_3$ | 0.2 NH$_4$Cl |
| 1.0 NaCl | (solid) | 0.1 NaHCO$_3$ 0.8 NaCl |

| C - RECOVERY OF NH$_3$ AND CO$_2$ | | | |
|---|---|---|---|
| Mother Liquor Eq. | Addition Eq. | Gas Moles | Soda Free Eq. |
| 1.8 NH$_4$HCO$_3$ | | | |
| 0.2 NH$_4$Cl | 0.1 NaHCO$_3$ $\xrightarrow{heat}{100° C.}$ | 2.0 NH$_3$ | |
| 0.1 NaHCO$_3$ + 0.8 NaCl | (solid) | 2.0 CO$_2$ + 2.0 H$_2$O | 1.0 NaCl |

| D - CALCINING | | |
|---|---|---|
| 3.0 NaHCO$_3$ | $\xrightarrow{heat}{170 \text{ to } 190° C.}$ | 1.5 Na$_2$CO$_3$ + 1.5 CO$_2$ + 1.5 H$_2$O (soda-ash) |

Example 2

Material Balance for Soda Brine Having 2.0 Moles of Sodium Chloride with 1.0 Mole of Sodium Sesquicarbonate Per Liter

| A - AMMONIATION AND CARBONATION |
|---|

-continued

| Soda Brine Eq. | Addition (Moles) | Super Sat'd Soln. Eq. |
|---|---|---|
| 2.0 NaHCO$_3$ | | 3.0 NaHCO$_3$ |
| 1.0 NaOH + | 1.0 NH$_3$ $\longrightarrow$ | 1.0 NH$_4$HCO$_3$ |
| 2.0 NaCl | 2.0 CO$_2$ | 2.0 NaCl |
| | 1.0 H$_2$O | |

B - CRYSTALLIZATION

| Super Saturated Solution Eq. | Crystallization Eq. | Mother Liquor Eq. |
|---|---|---|
| 3.0 NaHCO$_3$ | | 0.8 NH$_4$CO$_3$ |
| 1.0 NH$_4$HCO$_3$ $\xrightarrow{\text{cryst.}}$ | 3.1 NaHCO$_3$ | 0.2 NH$_4$Cl |
| 2.0 NaCl | (solid) | 0.1 NaHCO$_3$ |
| | | 1.8 NaCl |

C - RECOVERY ON NH$_3$ AND CO$_2$

| Mother Liquor Eq. | Addition Eq. | Gas Moles | Soda Free Eq. |
|---|---|---|---|
| 1.8 NH$_4$HCO$_3$ | | | |
| 0.2 NH$_4$Cl + | 0.1 NaHCO$_3$ $\xrightarrow{\text{heat}}_{100° C.}$ | 1.0 NH$_3$ + | 2.0 NaCl |
| 0.1 NaHCO$_3$ + | (solid) | 1.0 CO$_2$ | |
| 1.8 NaCl | | 1.0 H$_2$O | |

D - CALCINING

| | | | |
|---|---|---|---|
| 3.0 NaHCO$_3$ | $\xrightarrow{\text{heat}}_{170 \text{ to } 190° C.}$ | | 1.5 Na$_2$CO$_3$ + 1.5 CO$_2$ + 1.5 H$_2$O (soda-ash) |

Figure 2:
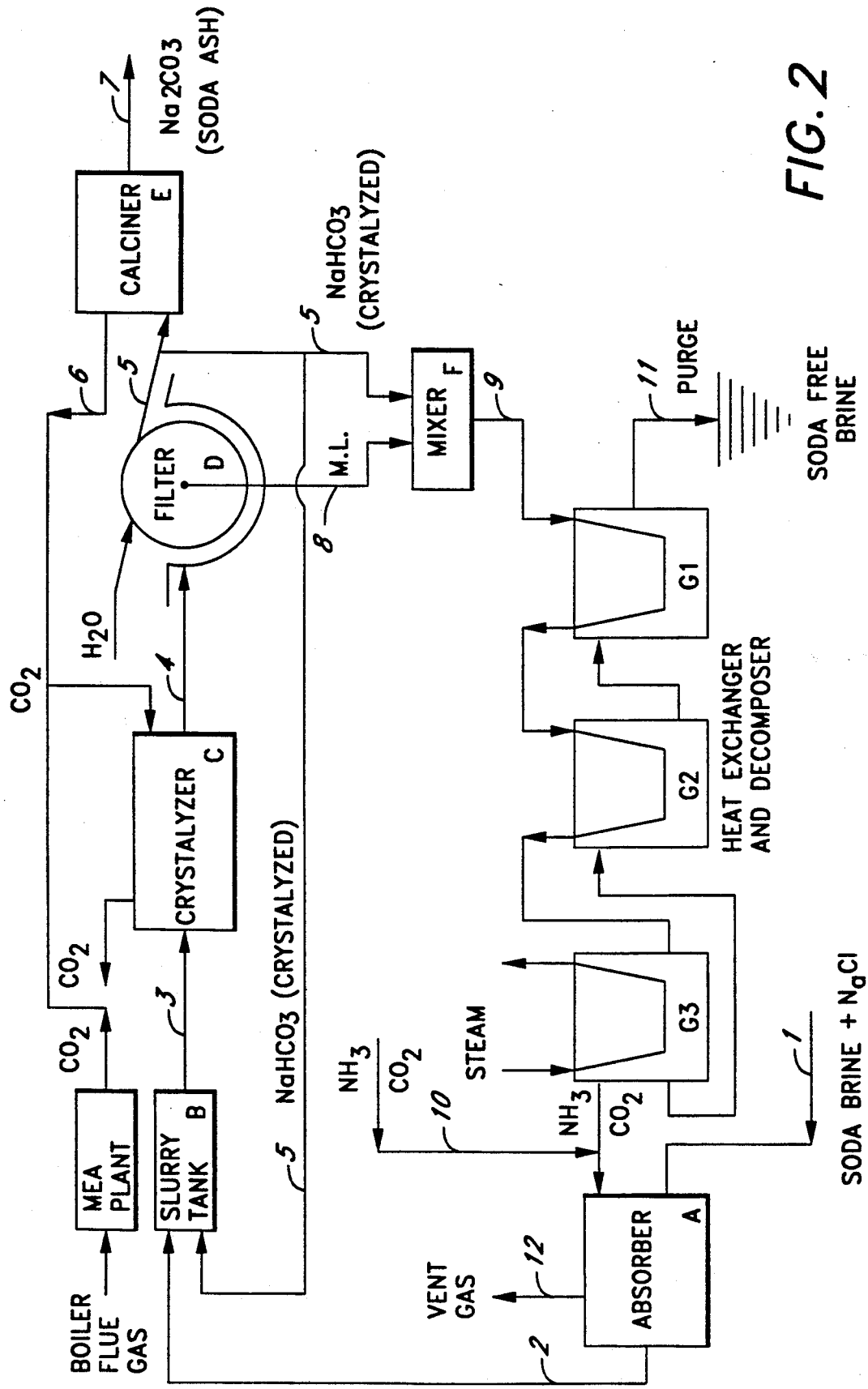
FIG. 2 is a schematic representation of one example of the process in which natural soda brine is the feed stock.
Figure 3:
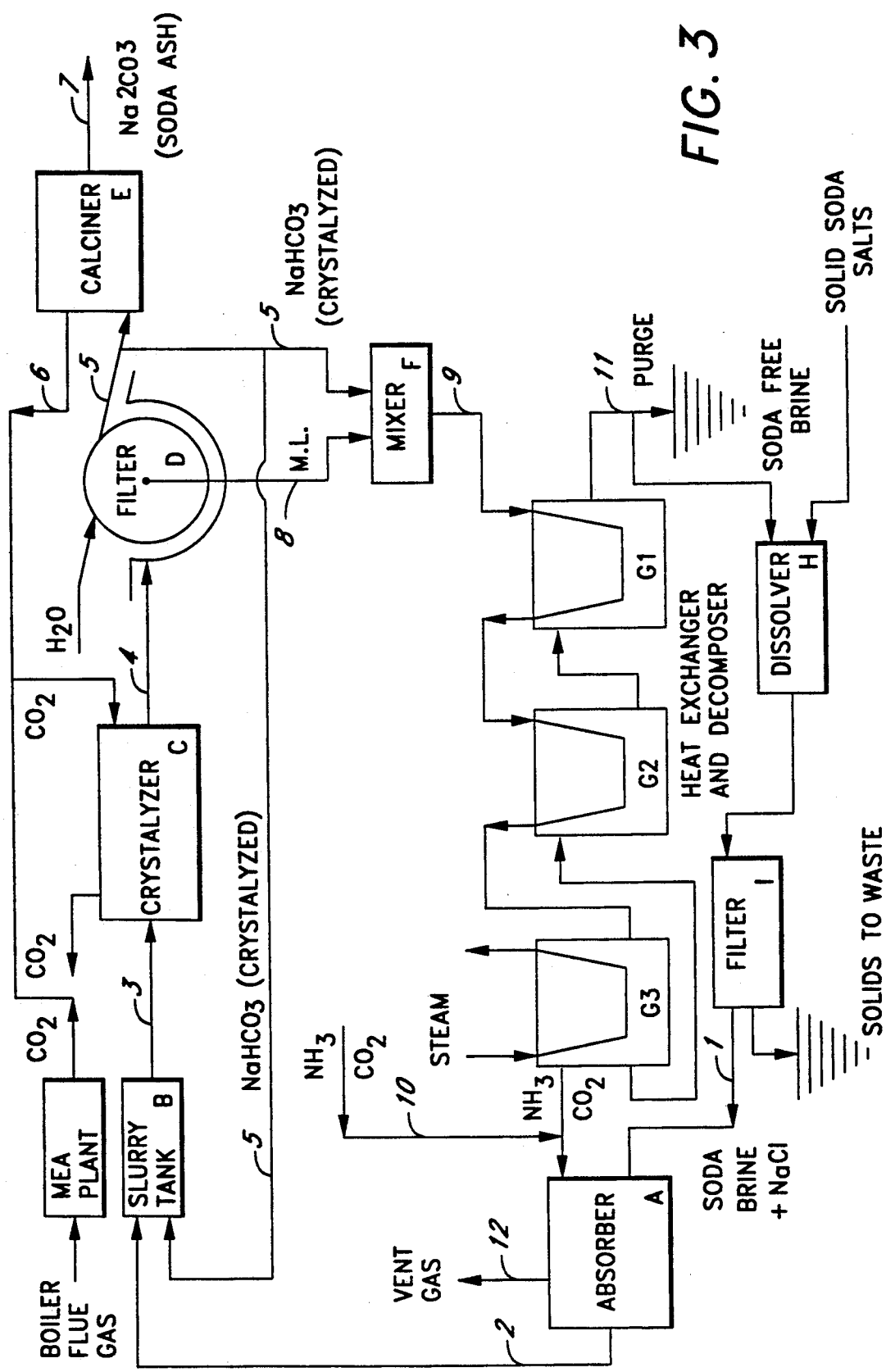
FIG. 3 is a schematic representation of another example of the process in which solid soda salts with insoluble solids is the feed.
Figure 4:
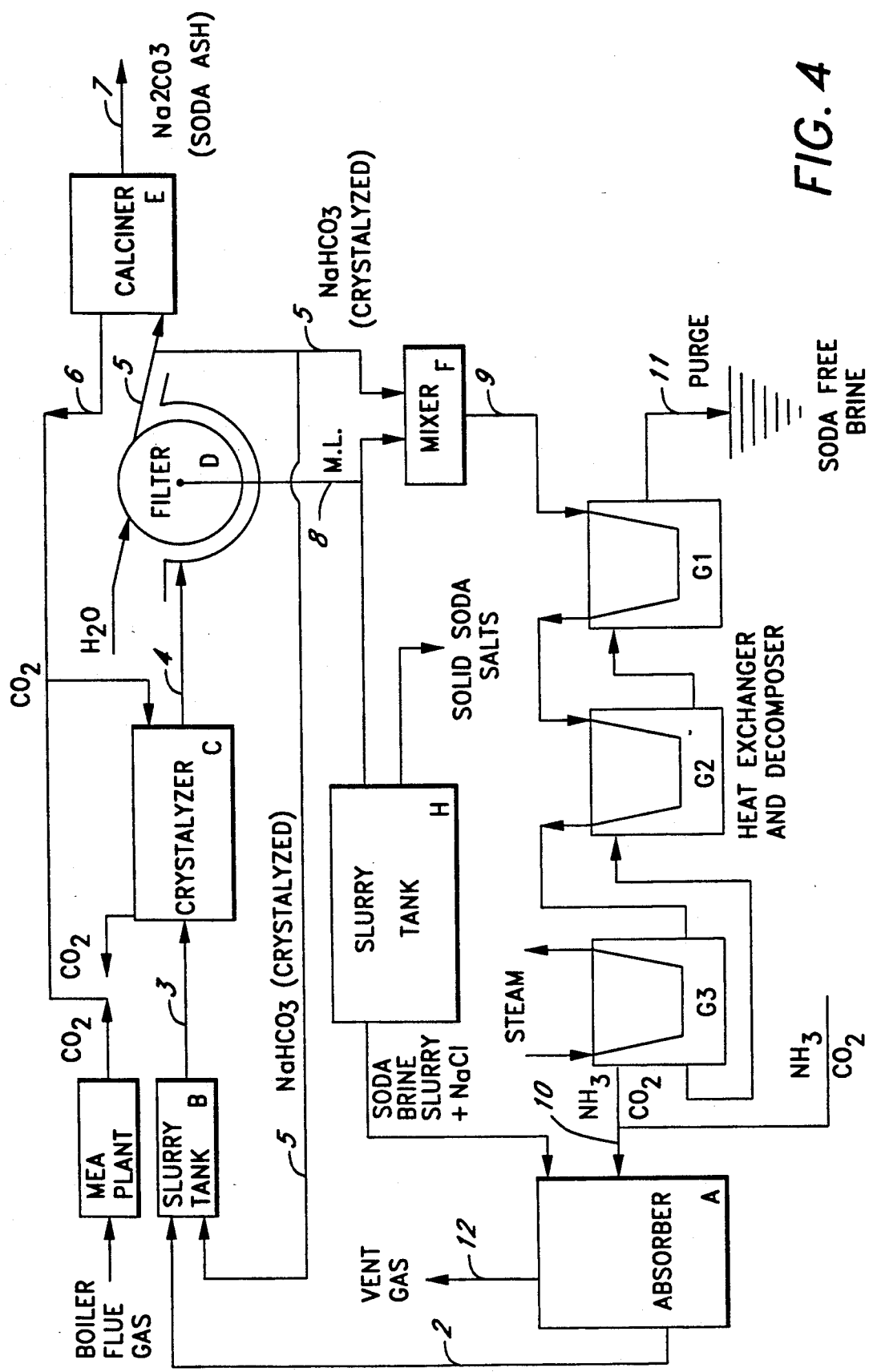
FIG. 4 is a schematic representation of still another example of the process in which solid soda salts free of insoluble solids is the feed.

FIGS. 2, 3 and 4 and the accompanying text hereinbelow are provided as examples of the use of the process of the present invention using different soda containing feed stocks.

Referring now to FIG. 2, natural soda brine 1 and the ammonia and carbon dioxide 10 are sent to the absorber A with a fifteen to forty-five (15-45) minutes of retention time in the absorber A. This type of natural soda brine can be found, for example, in Searles Lake, Owens Lake and Lago de Texcoco. The absorption of the gases and the exothermic reactions I through IV generate heat, thus resulting in a temperature rise which must be kept below 40° C. However, if the input brine is at an elevated temperature, it is advantageous to cool it, before adding ammonia and carbon dioxide gases. This prevents the temperature of the brine from rising too high, i.e., above 40° C., prior to recovery of sodium bicarbonate crystals.

In FIG. 3, solid soda salts, such as sodium carbonate (Na$_2$CO$_3$) sodium carbonate mono-hydrate (Na$_2$CO$_3$.H$_2$O) sodium carbonate hepta-hydrate (Na$_2$CO$_3$.7H$_2$O), sodium carbonate deca-hydrate (Na$_2$CO$_3$.10H$_2$O), sodium sesqui-carbonate (Na$_2$CO$_3$.NaHCO$_3$.2H$_2$O), and/or Wegscheider salts (Na$_2$CO$_3$.3NaHCO$_3$) with insoluble material, are used as feed material for the process. This type of salt deposit can be found, for example, in the region around Green River, Wyo. The vehicle used is soda free brine 11 from the heat exchanger G-1. The vehicle is cooled before being sent to the dissolver I to which is added 10% or more of the solid soda salts. The soda brine solution with the solid impurities in suspension is sent to filter J to separate filtered soda brine 1, which is sent to the absorber A and the solid impurities are sent to waste.

In FIG. 4, solid soda salts exempt of insoluble solid substances are used as feed material for the process. The vehicle used for the salts is filtered, saturated mother liquor 8 from the filter D. In this process, the saturated mother liquor 8 is sent to the slurry tank H to which is added 10% or more of the solid soda salts and the soda brine slurry 1 is sent to the absorber A.

In these examples, the absorber A is agitated in order to facilitate absorption and maintain solids in suspension and is kept below 40° C. It is not necessary for reaction I through VI to proceed to completion within the absorber A, as long as the gases are absorbed. Thus, the absorber is preferably provided with a vent 12, which will allow excess gas to leave the system thus inherently providing that the reactions are conducted at atmospheric pressure. The outflow of the absorber A is a super-saturated solution of sodium bicarbonate 2 in the soda brine.

The outflow 2 from the absorber A proceeds in a constant flow through the absorber to the slurry tank B in which solid sodium bicarbonate is added to act as seed crystals. Preferably, the solid sodium bicarbonate in an amount of 5-10% of the soda brine, is added to relieve the super-saturation. The solid sodium bicarbonate 5 is produced in crystallizer C through the constant flow process and separated in D.

The slurry tank B is designed to provide a retention time of near zero. Thus, the outflow 3 from the slurry tank proceeds almost immediately into a slurry outflow and into a crystallizer C. In the crystallizer, the super-saturation is relived by the crystallization of sodium bicarbonate on the seed crystals. The crystallizer C may be one or more crystallizers in series. The constant flow system of the preferred embodiment is designed to allow for a relatively long retention time of two to four hours. The temperature within the crystallizers C is kept below 40° C. by cooling. Advantageously, complete crystallization occurs therein without any need for concentrating the brine; carbon dioxide (CO$_2$) 6 from calciner E is added to the crystallizer in order to complete the carbonation process.

Crystallization is allowed to proceed until the amount of ammonium chloride (NH$_4$Cl) formed by the double decomposition of sodium chloride (NaCl) and ammonium bicarbonate (NaH$_4$HCO$_3$) exceeds the sodium bicarbonate concentration in the brine.

The outflow from the crystallizer C, consisting of a slurry 4 of sodium bicarbonate crystals and saturated mother liquor, proceeds through the crystallizer outflow and into a separator D. In the preferred embodiment, the separator D is a filtration apparatus; however, separation can also be accomplished with other separation devices known to those of skill in the art, such as a centrifuge.

The sodium bicarbonate crystals 5 are removed from the mother liquor and washed. The wash solution is recovered and returned to the mother liquor 8. The crystals are then ready for further processing or use. An example of such a further processing step is calcining the sodium bicarbonate in calciner E at a temperature in the range 170°-190° C. in order to produce carbon dioxide and sodium carbonate (soda-ash) therefrom. In an alternative embodiment, a portion of the separated sodium bicarbonate crystals are used as seed crystals in the slurry tank B, as previously described. The calcining step produces CO$_2$ 6 which is returned to the crystallizer C as previously described.

The saturated mother liquor 8, now devoid of crystals, proceeds through the separator outflow and into a mixer F where another portion of the separated sodium bicarbonate crystals 5 are added in order to allow Reaction IX to proceed. This requires a very short retention time in the mixer F, solely in order to allow the sodium bicarbonate crystals to be suspended in the mother liquor with the mixing action of the mixer.

In FIG. 4, in which solid sodium salts are used that are free of extraneous, insoluble substances, often the filtered mother liquor 8 from the filter D is used as a vehicle to introduce these solid sodium salts to the process. The mother liquor 8 is sent to the slurry tank H to which is added 10% or more of the solid soda salts and then the soda brine slurry 1 is sent to the absorber A. The volume and mother liquor is kept constant in each cycle.

In order to avoid using excess sodium bicarbonate in the regeneration process of Reaction IX, yet fully recover ammonia and carbon dioxide gas, the ammonium chloride and sodium bicarbonate content of the mother liquor is analyzed, in a manner known to those of skill in the art, prior to the addition of solid sodium bicarbonate to the filtered mother liquor. For example, the amount of sodium bicarbonate is first deducted from the ammonium chloride content dissolved in the saturated mother liquor 8. Then, an equivalent amount of solid sodium bicarbonate 5 is added to the mother liquor 8 prior to heating. For the full recovery of ammonia and carbon dioxide gas, the sodium bicarbonate 5 which is used is exclusively the sodium bicarbonate formed by the double decomposition of sodium chloride and ammonia bicarbonate.

The temperature of the mother liquor is generally at about 40° C., due to the net exothermic nature of the reactions which have occurred, as previously described. However, in order to heat the mother liquor 8 efficiently, the mother liquor can be sent through a series of heat exchangers in a counter current fashion using steam in the last exchanger G-3.

As shown in FIGS. 2 through 4, three heat exchangers G-1, G-2 and G-3 are provided; however, those of skill in the art will recognize that the number and size of the heat exchanger can be varied in order to optimize the amount of energy required to heat the mother liquor to its boiling point, using steam in the last heat exchanger.

The evolved gases are drawn off into the gas input line 10 for reapplication in the absorber A. Once the system has been operating through at least one complete cycle, it is generally necessary to add a small amount of additional ammonia gas and/or carbon dioxide through gas inlet 10 and if necessary, some sodium chloride is added to the soda brine in order to keep the concentration of ammonia and carbon dioxide gas and sodium chloride to a level in accordance with the values of Table II and the calculated carbon dioxide required.

In FIG. 3, the soda free brine 11 from G-1 from which the ammonia and carbon dioxide gas has been recovered is used to dissolve solid soda salts that contain insoluble material in dissolver H. Ten percent or more of solid soda salts are dissolved in the soda free brine which is filtered in J; filtered soda brine 1 is sent to the absorber A. The water content of the system is kept constant, the excess is purged, the and solid impurities are sent to waste.

As discussed above, theoretically, the process will produce more carbon dioxide than is necessary. However, in practice, we have found that it is generally necessary to add additional amounts, to completely carbonate the brine during constant flow, in accordance with the method for determining the amount of carbon dioxide described above, plus the carbon dioxide introduced during crystallization.

SCOPE OF INVENTION

The foregoing examples are shown merely to illustrate, rather than to limit, the present invention. It will be appreciated that certain structural variations may suggest themselves to those skilled in the art. For example, the production of potassium bicarbonate can be obtained by substituting the potassium salts for the corresponding sodium salts described herein. The foregoing detailed description is to be clearly understood as given by way of illustration, the spirit and scope of this invention being interpreted in light of the appended claims.

What is claimed is:

1. A carbonation process for the production of solid sodium bicarbonate from natural soda deposits, comprising:
    obtaining a solution of said deposits that contains sodium chloride, wherein this obtaining step comprises adding sodium chloride to the solution if said deposits lack natural sodium chloride;
    ammoniating soda brine from said deposits to form ammonium hydroxide;
    carbonating said ammoniated soda brine from said deposits to form ammonium bicarbonate;
    reacting said ammonium bicarbonate with sodium carbonate to form sodium bicarbonate and ammonium hydroxide;
    forming sodium bicarbonate and excess equivalents of ammonium chloride from the double decomposition reaction of ammonium bicarbonate and sodium chloride;
    determining the excess equivalents of ammonium chloride over the equivalents of sodium bicarbonate in the solution produced after the double decomposition reaction of ammonium bicarbonate and sodium chloride;
    adding an amount of solid sodium bicarbonate to the solution in an equivalent amount to said excess equivalents; and
    heating the solution, thereby recovering ammonia and carbon dioxide from the solution.

2. The process of claim 1, wherein the reacting step continues until all sodium carbonate present in the soda brine is depleted.

3. The process of claim 2, wherein the ammonium hydroxide acts a carbon dioxide carrier until the sodium carbonate is depleted.

4. The process of claim 1, additionally comprising adding non-alkaline sodium salts to furnish sodium ions to decrease the solubility of sodium bicarbonate.

5. The process of claim 1, wherein the amount of ammonia required to add to the brine is determined according to the concentration of non-alkaline sodium salts in the brine.

6. The process of claim 5, wherein said solution contains sodium chloride in a concentration in the range of 0.5 to 3.0 equivalents per liter and the ammonia is added in an amount that is inversely proportional to the amount of sodium chloride, such that the amount of ammonia multiplied by the amount of sodium chloride is in the range of 1.5 to 3.0.

7. The process of claim 1, wherein the solid soda deposits are substantially free of non-soluble foreign material, wherein saturated mother liquor is formed as a result of the process, and wherein the saturated mother liquor is used to introduce solid soda salts as feed to the process.

8. The process of claim 1, wherein saturated mother liquor is formed as a result of the process, additionally comprising returning solid sodium bicarbonate to the saturated mother liquor in an amount equivalent to the difference between the equivalents of ammonium chloride in solution and the equivalents of sodium bicarbonate retained in solution.

9. The process of claim 8, additionally comprising hearing the saturated mother liquor with the sodium bicarbonate in suspension to decompose the ammonium chloride in order to regenerate the ammonia as gas.

10. The process of claim 9, additionally comprising recycling the regenerated ammonia into the process.

11. The process of claim 1, wherein there is complete conversion of the sodium carbonate in the soda deposits to sodium bicarbonate.

12. The process of claim 1, wherein the final solution after recovery of ammonia and carbon dioxide from the saturated mother liquor is a soda free brine to which no contaminants have been added.

13. The process of claim 12, wherein the solid soda deposits include extraneous, insoluble solid material, additionally comprising dissolving the soda deposits in the soda free brine and filtering the resulting solution prior to entering the process.

14. The process of claim 13, wherein the volume of the solution in the system is maintained constant by purging excess volume.

15. The process of claim 12, wherein the soda free brine is evaporated to obtain solid sodium chloride therefrom, or is sent to waste.

16. The process of claim 12, additionally comprising:
adding solid soda salts to the soda free brine;
filtering the soda free brine; and
recycling the filtered soda free brine to the process.

17. The process of claim 14, wherein the purging occurs after recovery of ammonia and carbon dioxide.

18. The process of claim 1, wherein the natural soda deposits comprise solid soda salts comprising at least one of the following: sodium carbonate ($Na_2CO_3$), sodium carbonate mono-hydrate ($Na_2CO_3.H_2O$), sodium carbonate hepta-hydrate ($Na_2CO_3.7H_2O$), sodium carbonate deca-hydrate ($Na_2CO_3.10H_2O$), sodium sesquicarbonate ($Na_2CO_3.NaHCO_3.2H_2O$), and Wegscheider salts ($Na_2CO_3.3NaHCO_3$).

19. The method of claim 1, wherein the ammoniating and carbonating steps are performed at atmospheric pressure.

20. A process for the substantially total recovery of the alkalinity from soda brine as crystallized sodium bicarbonate without the need for evaporating said soda brine, said soda brine comprising sodium carbonate, sodium bicarbonate and other soluble salts, said process comprising:
adding sodium chloride to said brine to bring the sodium chloride concentration of the brine to within the range 0.5 to 3.0 equivalents per liter;
ammoniating said brine to form ammonium hydroxide by adding ammonia in an amount inversely proportional to the amount of sodium chloride in said brine, such that the amount of ammonia multiplied by the amount of sodium chloride is in the range of 1.5 to 3.0; and
carbonating said ammoniated brine to form ammonium bicarbonate by adding carbon dioxide in the amount of one mole of carbon dioxide per mole of ammonia added, plus one mole of carbon dioxide for each mole of sodium carbonate in the brine per liter.

21. The method of claim 20, additionally comprising:
supersaturating said carbonated brine with sodium bicarbonate;
adding sodium bicarbonate seed crystals to relieve the supersaturation of the brine.

22. The method of claim 21, wherein the supersaturation results from an increase in the sodium bicarbonate originally present in the brine due to sodium bicarbonate produced in the process, and from the lowered solubility of sodium bicarbonate resulting from non-alkaline sodium ions which were either present in the brine or, added thereto.

23. The method of claim 21, wherein the ammonium bicarbonate reacts with the sodium carbonate in the brine to form sodium bicarbonate and ammonium hydroxide until all of the sodium carbonate present is depleted and whereby the ammonium hydroxide acts as a carbon dioxide carrier.

24. The method of claim 23, wherein when the sodium carbonate is exhausted and the supersaturation is relieved by crystallization, the sodium ions present in the brine react with the bicarbonate ions of the ammonium bicarbonate in a double decomposition to form ammonium chloride and sodium bicarbonate.

25. The method of claim 24, wherein the solution of sodium bicarbonate suspension is analyzed for its ammonium chloride and sodium bicarbonate concentration and the suspension is sent to the separator when the ammonium chloride concentration exceeds that of the sodium bicarbonate in solution.

26. The method of claim 25, wherein the reactions of the process occur in a crystallizer and generate a net heat gain, and wherein the temperature of the crystallizer is kept below 40° C. by cooling the brine before processing or during the process.

27. The method of claim 26, wherein the crystallized sodium bicarbonate is separated from the saturated mother liquor and portions of the solid bicarbonate are recycled to a slurry tank for use as the seed crystals, wherein another portion of crystallized sodium bicarbonate is used to regenerate the ammonia from the saturated mother liquor, and wherein the rest of the sodium bicarbonate is calcined to form sodium carbonate (soda-ash) and carbon dioxide for the process.

28. The method of claim 27, additionally comprising:
analyzing the separated, saturated mother liquor for its ammonium chloride and sodium bicarbonate content;
determining the difference in the amount of ammonium chloride from the amount of sodium bicarbonate in the solution; and
adding an amount equivalent to said difference of crystallized sodium bicarbonate to the filtered saturated mother liquor.

29. The method of claim 28, wherein the saturated mother liquor with the added sodium bicarbonate in suspension is heated to its boiling point to expedite the liberation of ammonia gas and carbon dioxide using steam.

30. The method of claim 29, additionally comprising heating and cooling the mother liquor using a heat exchanger in a counter current fashion.

31. The method of claim 30, wherein there is a total recovery of the ammonia that is recycled, without having to use any of the sodium bicarbonate from the original alkalinity of the brine.

32. The method of claim 30, wherein there is substantially total recovery of the carbonates and bicarbonates dissolved in the original brine, as sodium bicarbonate crystals.

33. The process of claim 30, wherein the final soda free brine is free of contaminants foreign to its original components, additionally comprising evaporating the final soda free brine to obtain solid sodium chloride therefrom, or sending the final soda free brine to waste.

34. A process for the production of sodium bicarbonate from soda brine solution comprised of sodium carbonate and sodium chloride having a concentration in the range 0.5 to 3.0 equivalents per liter in water, said process comprising:
   a. adding said soda brine to an absorber tank;
   b. adding carbon dioxide and ammonia gases to said absorber, thereby forming a supersaturates solution of sodium bicarbonate, wherein the ammonia is added in an amount that is inversely proportional to the amount of sodium chloride in said solution, such that the amount of ammonia multiplied by the amount of sodium chloride is in the range of 1.5 to 3.0;
   c. precipitating at least some of said sodium bicarbonate, thereby forming a suspension of solid sodium bicarbonate;
   d. separating said solid sodium bicarbonate from said mother liquor; and
   e. recovering ammonia by returning less than 0.1 gram equivalents per liter of separated solid sodium bicarbonate to the mother liquor, and heating the mother liquor.

* * * * *